United States Patent
Lin et al.

(10) Patent No.: US 8,019,856 B1
(45) Date of Patent: Sep. 13, 2011

(54) AUTOMATIC MAPPING AND LOCATION DISCOVERY OF COMPUTERS IN COMPUTER NETWORKS

(75) Inventors: Kun-Shan Lin, Taipei (TW); Chia-Chi Chang, Taipei (TW); Kai-Chih Hu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 408 days.

(21) Appl. No.: 11/983,070

(22) Filed: Nov. 7, 2007

(51) Int. Cl.
*G06F 15/173* (2006.01)

(52) U.S. Cl. ........................................ 709/224

(58) Field of Classification Search ............... 370/257, 370/277, 280, 310, 311, 315, 328, 329, 331, 370/338, 401, 399, 392, 390, 342, 312, 235; 709/203, 214, 206, 217, 218, 219, 223, 224, 709/227, 230, 231, 232, 239, 245, 242, 238, 709/229, 228, 221, 220; 455/3.06, 414.1, 455/434, 436, 437, 445, 456.1, 519, 561, 455/563, 69
See application file for complete search history.

(56) References Cited

U.S. PATENT DOCUMENTS

| | | | |
|---|---|---|---|
| 5,623,600 A | 4/1997 | Ji et al. | |
| 6,119,165 A | 9/2000 | Li et al. | |
| 6,725,377 B1 | 4/2004 | Kouznetsov | |
| 6,978,314 B2 * | 12/2005 | Tarr | 709/245 |
| 6,986,050 B2 | 1/2006 | Hypponen | |
| 7,099,853 B1 | 8/2006 | Liu et al. | |
| 7,188,369 B2 | 3/2007 | Ho et al. | |
| 7,792,989 B2 * | 9/2010 | Toebes et al. | 709/238 |
| 2004/0005873 A1 | 1/2004 | Groenendaal et al. | |
| 2005/0064859 A1 | 3/2005 | Kotzin et al. | |
| 2005/0273841 A1 | 12/2005 | Freund | |
| 2005/0273853 A1 | 12/2005 | Oba et al. | |
| 2006/0187873 A1 * | 8/2006 | Friday et al. | 370/328 |
| 2006/0268834 A1 * | 11/2006 | Bajic | 370/352 |
| 2007/0030539 A1 * | 2/2007 | Nath et al. | 358/520 |
| 2007/0130361 A1 * | 6/2007 | Li | 709/231 |
| 2007/0271363 A1 * | 11/2007 | Ross et al. | 709/223 |

OTHER PUBLICATIONS

Fully Qualified Domain Name—Wikipedia, the free encyclopedia, May 19, 2007, pp. 2, [retrieved on Jun. 7, 2007]. Retrieved from the internet<http://en.wikipedia.org/wiki/FQDN>.
Nokia—Connecting People, Webpage [online]. [Retrieved on Jan. 10, 2006]. Retrieved from the Internet: <URL://http:press.nokia.com/PR/200409/959974_5.html>.
"Bluetooth—An Oview, Establishing network connections", [online]. Johnson Consulting 2001. [Retrieved on Jan. 10, 2006]. Retrieved from the Internet <URL://http:www.swedetrack.com/images/bluet14.htm>.

(Continued)

*Primary Examiner* — Asad M Nawaz
*Assistant Examiner* — Charles Murphy
(74) *Attorney, Agent, or Firm* — Okamoto & Benedicto LLP (57) ABSTRACT

A scan client in a subnet of an intranet may be designated as a root agent to provide subnet information to a scan server in the intranet. The subnet information may include addresses of computers belonging to the subnet. The scan server may use subnet information collected from various root agents to build a map of the intranet. The intranet map may be forwarded from the scan server to the root agents, which in turn provide the intranet map to scan clients in their respective subnets. The root agents may also receive antivirus modules from the scan server for distribution to scan clients. A scan client may look for computers indicated in the intranet map to determine whether or not it is connected to the intranet.

10 Claims, 8 Drawing Sheets

OTHER PUBLICATIONS

PCTechGuide—netscalibur. [online] [Retrieved on Jan. 6, 2006]. Retrieved from the Internet<URL:http://www.pctechguide.com/30mobcomms_Bluetooth.htm>.

Bluetooth—An Overview, How networks are formed and formed and controlled. [online]. Johnson Consulting 2001. [Retrieved on Jan. 6, 2006]. Retrieved from the Internet <URL:http://www.swedetrack.com/image/bluet10.htm>.

Paila, et al., "Flute—File Delivery Over Unidirectional Transport", Oct. 2004, pp. 1-33. [retrieved on Sep. 14, 2005]. Retrieved from the Internet <URL:http://www.ietf.org/rfc/rfc3926.html>.

Luby, et al., "Forward Error Correction (FEC) Building Block", Dec. 2002, pp. 1-16. [retrieved on Sep. 1, 2005]. Retrieved from the Internet <URL:http://www.apps.ietf.org/rfc/rfc3452.html>.

Puneet Gupta, "Short Message Service: What, How and Where?", Wireless Developer Network, [on line], [retrieved on Oct. 4, 2005]. Retrieved from the Internet: <URL: http://www.wirelessdevnet.com/channels/sms/features/sms.html>.

NOW.SMS, Home of the Now SMS/MMS Gateway, [on line], [retrieved on Oct. 5, 2005]. Retrieved from the Internet <URL: http://www.nowsms.com/documentation/ProductDocumentation/configuring_smsc_connections/GSM_Modems.htm>.

SearchDomino.com, Practical information, timely trends and technology insight on applications for collaboration. [on line], [retrieved from the Internet <URL: http://searchdomino.techtarget.com/sDefinition/0sid4_gci934583,00.html>.

* cited by examiner

AUTOMATIC MAPPING AND LOCATION DISCOVERY OF COMPUTERS IN COMPUTER NETWORKS

BACKGROUND OF THE INVENTION

1. Field of the Invention

The present invention relates generally to computer networks, and more particularly but not exclusively to mapping and location discovery of computers in computer networks.

2. Description of the Background Art

Computer viruses, worms, Trojans, rootkits, and spyware are examples of malicious codes that have plagued computer systems throughout the world. Malicious codes, which are also collectively referred to simply as "viruses" or "malware," may be detected using antivirus techniques implemented in software, hardware, or a combination of hardware and software. An antivirus may employ a scan engine and malicious code patterns, which are also referred to as "virus patterns." To scan data for viruses, the scan engine compares the content of the data to the virus patterns using a pattern matching algorithm. The data is deemed infected if a match is found. In that case, various cleaning steps may be performed to prevent the virus from proliferating including quarantine, disinfection, removal, alerting the user or administrator, and so on. Virus patterns have to be continually updated to keep up with the ever increasing number and sophistication of malicious codes.

Organizations with a relatively large computer network may operate a scan server for providing antivirus modules (e.g., antivirus, updates, etc.) to client computers belonging to the network. The scan server may receive antivirus modules from the vendor of the antivirus for distribution to the client computers. The scan server may also be used to manage antivirus and other security operations in the computer network. One problem that arises in these computer networks is that a client computer roaming from one network location to another will have to be reconfigured manually to connect to the scan server in the current location. This can be tedious to the network administrator depending on the size of the network, the number of scan servers in the organization, and the number of users moving from one network location to another. Additionally, even when a client computer is manually configured to connect to a particular scan server, the client computer has no way of identifying its location in the computer network when that scan server is down.

A more general concern is that mobile computers, such as laptops, notebooks, tablet PCs, etc., are used in more than one location without the capability to automatically discover whether they are still in the private computer network of their organization or have moved to a public computer network. This poses a problem to network administrators who want to set up different security policies for the client computers depending on whether they are on the private computer network or on a public computer network, such as the Internet.

SUMMARY

In one embodiment, a scan client in a subnet of an intranet may be designated as a root agent to provide subnet information to a scan server in the intranet. The subnet information may include addresses of computers belonging to the subnet. The scan server may use subnet information collected from various root agents to build a map of the intranet. The intranet map may be forwarded from the scan server to the root agents, which in turn provide the intranet map to scan clients in their respective subnets. The root agents may also receive antivirus modules from the scan server for distribution to scan clients. A scan client may look for computers indicated in the intranet map to determine whether or not it is connected to the intranet.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
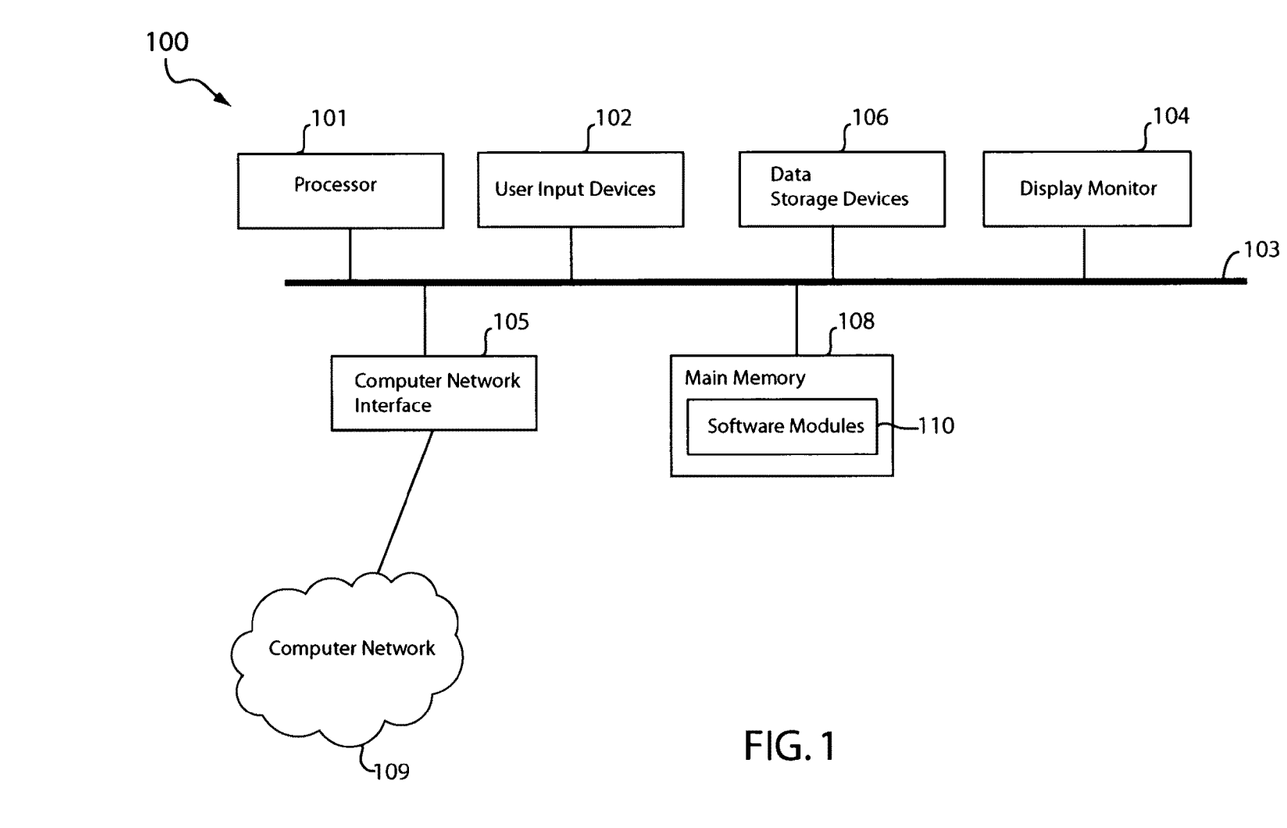
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a scan client computer 203 (e.g., see FIG. 2) or scan server computer 320 (e.g., see FIG. 3), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

Figure 3:
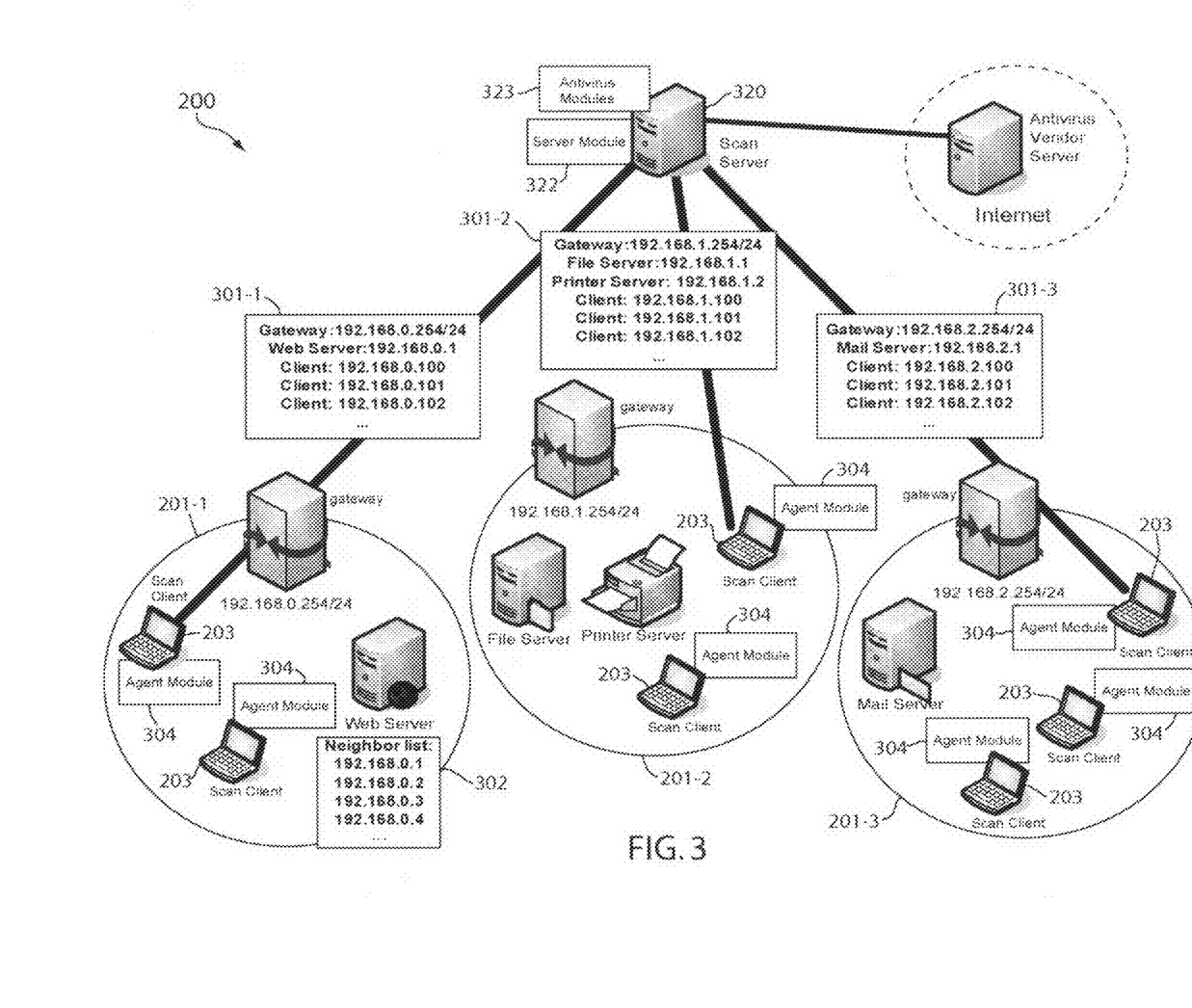
FIG. 3 schematically shows further details of the intranet of FIG. 2 in accordance with an embodiment of the present invention.

In the example of FIG. 1, the main memory 108 includes software modules 110, which may comprise software components of a scan client computer 203 (e.g., see FIG. 3, agent module 304) or scan server computer 320 (e.g., see FIG. 3, server modules 322, antivirus modules 323). The software modules 110 may be loaded from the data storage device 106 to the main memory 108 for execution by the processor 101. The computer network interface 105 may be coupled to a computer network 109.

Figure 2:
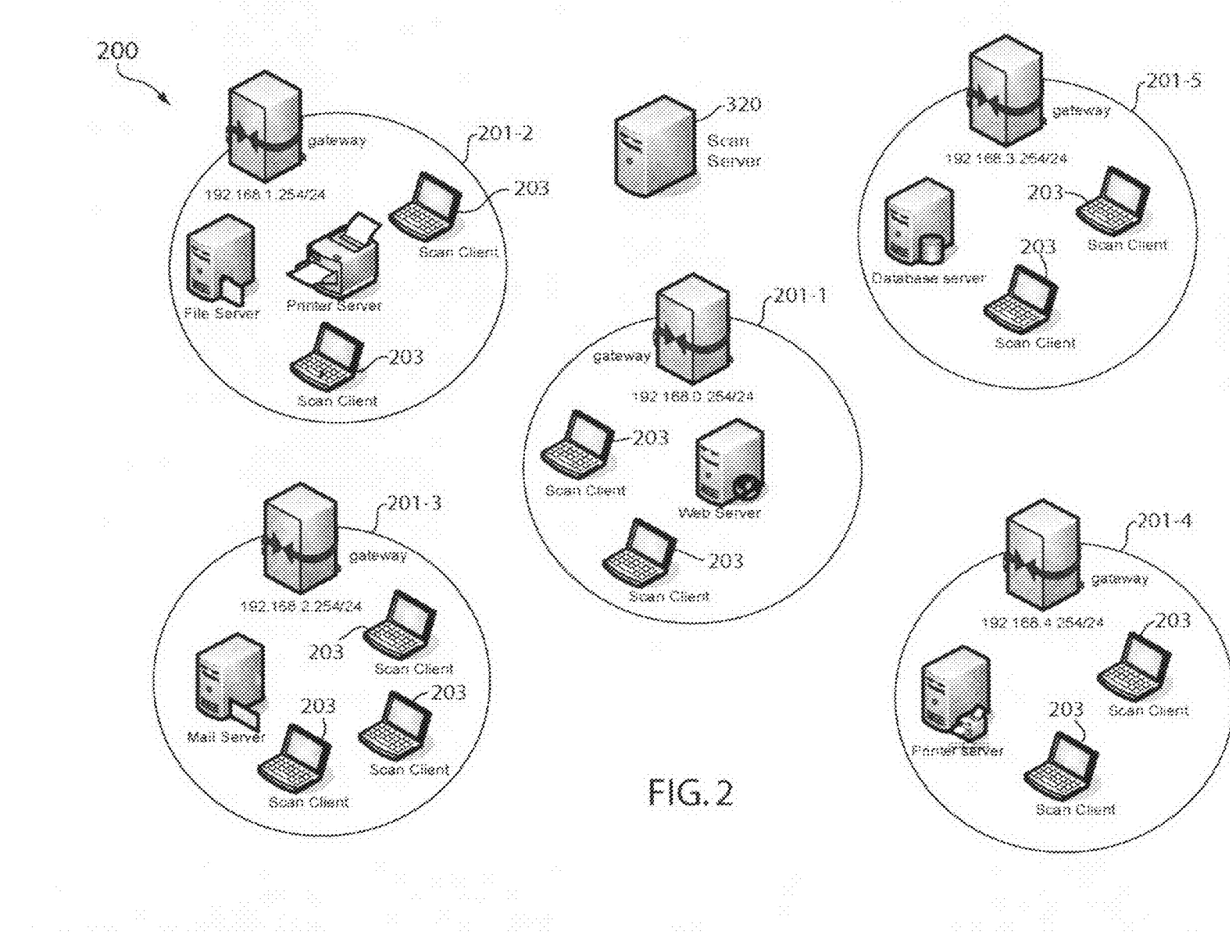
FIG. 2 schematically shows an intranet in accordance with an embodiment of the present invention.

FIG. 2 schematically shows an intranet 200 in accordance with an embodiment of the present invention. The intranet 200 may comprise a private computer network of an organization, such as a company, government, school etc. As is well known, an intranet may be divided into subsections referred to as "subnets." A subnet is typically identified in the hostid field of the intranet's address. Although subnets are separate networks within the intranet, the intranet and its subnets appear to the outside world as a single network.

In the example of FIG. 2, the intranet 200 comprises a plurality of subnets 201 (i.e., 201-1, 201-2, ...). A subnet 201 is a subsection of the intranet 200 and may include a gateway and various servers, including file, e-mail, database, printer, web, DHCP (Dynamic Host Control Protocol), and other servers depending on the configuration of the subnet. A subnet 201 may also include a plurality of scan clients 203. A scan client 203 may comprise a computer that may be employed by its user at different locations in the intranet 200. For example, a scan client 203 may comprise a notebook computer that roams from one subnet 201 to another. The scan clients 203 are depicted as portable computers, but may also be other types of computers in general. In the example of FIG. 2, the intranet 200 further includes a scan server 320. The scan server 320 may comprise a computer configured to support antivirus and other network security operations in the intranet 200.

FIG. 3 schematically shows further details of the intranet 200 in accordance with an embodiment of the present invention. As shown in FIG. 3, each subnet 201 may include an associated subnet information 301 (i.e., 301-1, 301-2, ...). A subnet information 301 may include the IP (Internet Protocol) and MAC (Media Access Control) addresses of the gateway and IP addresses of servers and client computers, including the scan clients 203, in the corresponding subnet 201. In the example of FIG. 3, the subnet information 301-1 comprises subnet information of the subnet 201-1, the subnet information 301-2, comprises subnet information of the subnet 201-2, the subnet information 301-3 comprises subnet information of the subnet 201-3, and so on.

Each subnet 201 may also include an associated neighbor list 302. A neighbor list 302 may include a listing of IP addresses of scan clients 203 in the same the subnet 201. Only one neighbor list 302, which is for the subnet 201-1, is shown in FIG. 3 for clarity of illustration. It is to be noted that subnets 201-2, 201-3, and so on each has its own neighbor list 302.

The scan server 320 may be configured to receive antivirus modules 323 (e.g., virus patterns, updates, scan engines) from the server of a vendor of antivirus products employed in the scan clients 203. The scan server 320 may include a server module 322, which in one embodiment comprises computer-readable program code for communicating with the scan clients 203. In one embodiment, the server module 322 is configured to receive subnet information from and provide a map of the intranet 200 to a scan client 203 that is designated to be a "root agent" for a particular subnet 201. More specifically, each subnet 201 may have a scan client 203 that serves as a root agent, and that root agent communicates with the scan server 320 to receive antivirus modules 323 and other data on behalf of the other scan clients 203. The designated root agent, in turn, provides the antivirus modules 323 and other data received from the scan server 320 to the other scan clients 203. As can be appreciated, this advantageously reduces network traffic in the intranet 200. In the example of FIG. 3, the root agents are the scan clients 203 depicted as being connected to the scan server 320 by way of a bold line.

A scan client 203 may include an agent module 304. The agent module 304 may comprise computer-readable program code for determining if its scan client 203 is connected to the intranet 200 or to a public computer network, for communicating with other scan clients 203, and for communicating with the scan server 320 when its scan client 203 is the designated root agent. An agent module 304 may be configured to monitor network communications performed on the computer it is running on to discover various servers on its subnet 201, and to report these servers including their IP addresses to a root agent upon registration. An agent module 304 may also be configured to connect (either manually or automatically) to its designated scan server 320 upon installation.

Figure 4:
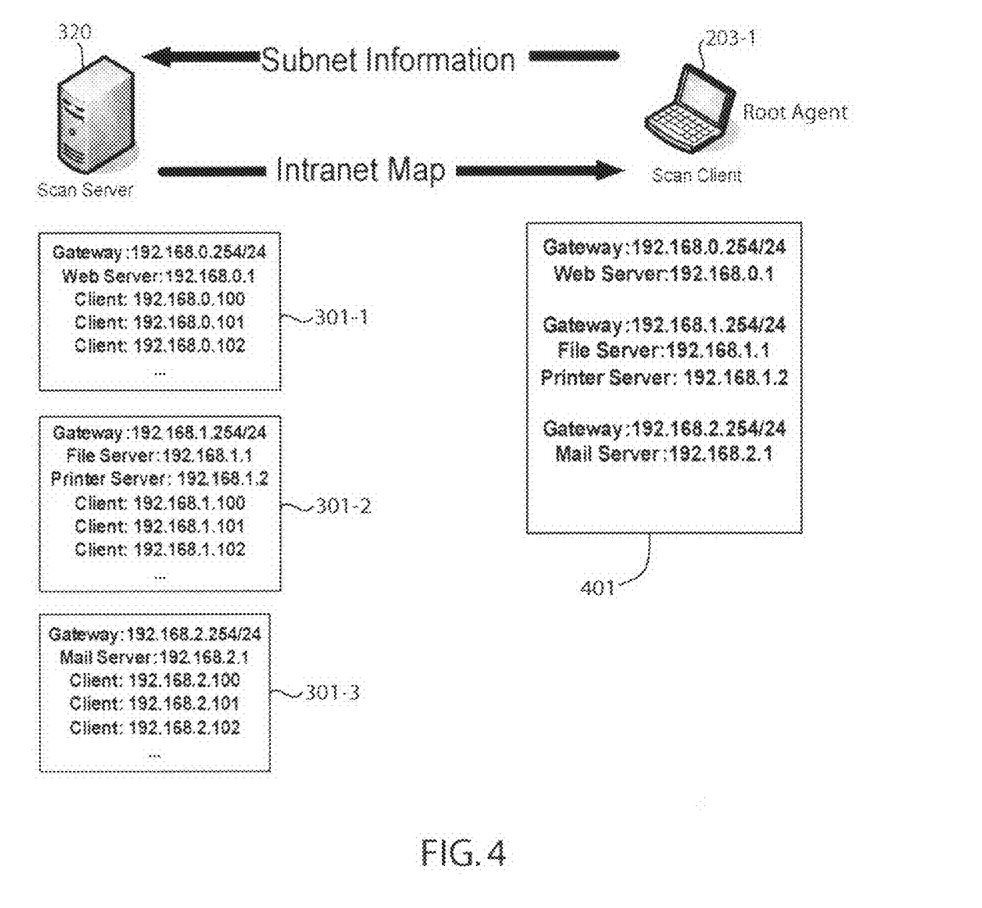
FIG. 4 schematically illustrates data exchange between a scan server and a scan client designated as a root agent in accordance with an embodiment of the present invention.

FIG. 4 schematically illustrates data exchange between the scan server 320 and a scan client 203-1 designated as a root agent. The scan server 320, by way of its server module 322, may be configured to receive subnet information 301 from each root agent of each subnet 201 of the intranet 200. In the example of FIG. 4, the scan server 320 has received the subnet information 301-1 from a root agent in the subnet 201-1 (see FIG. 3), the subnet information 301-2 from a root agent in the subnet 201-2, the subnet information 301-3 from a root agent in the subnet 201-3, and so on. The scan server 320, by way of its server module 322, uses the subnet information to automatically create an intranet map 401 of the intranet 200. The intranet map 401 may comprises IP and/or MAC addresses of computers belonging to the intranet 200.

Figure 5:
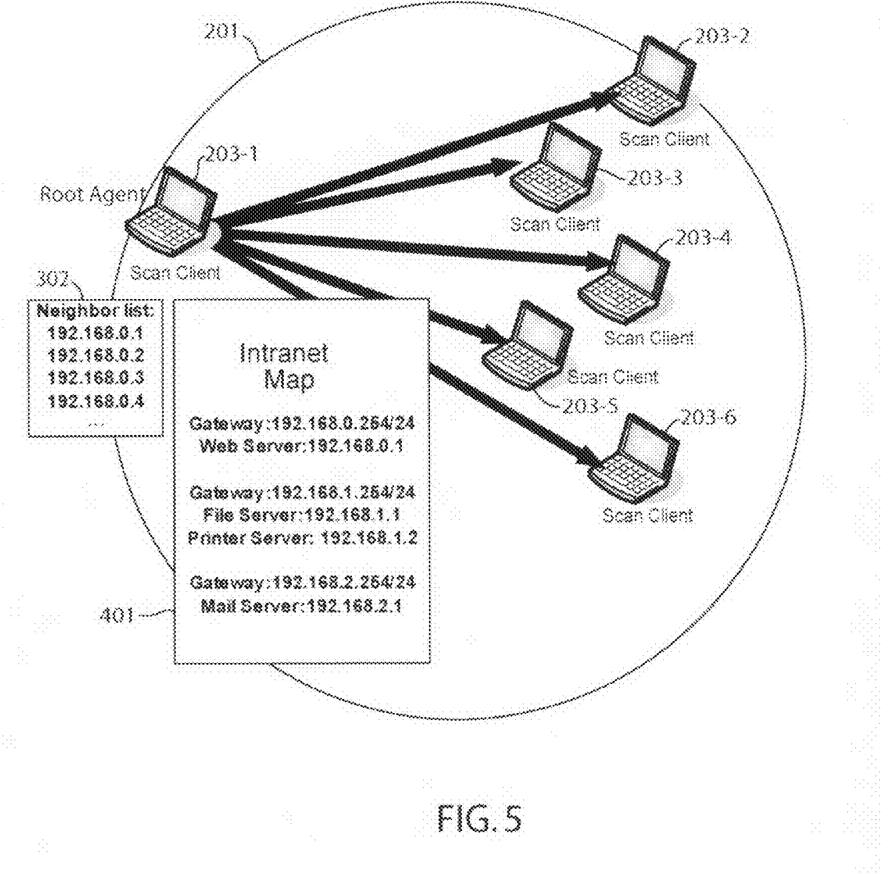
FIG. 5 schematically illustrates distribution of a neighbor list and an intranet map in a subnet in accordance with an embodiment of the present invention.

The scan server 320 provides the intranet map 401 to each of the root agents, which in the example of FIG. 4 includes the scan client 203-1. The root agents, in turn, provide the intranet map 401 to scan clients 203 in their respective subnets 201. This operation is schematically illustrated in FIG. 5, where the scan client 203-1 provides the intranet map 401 received from the scan server 320 to other scan clients 203 belonging to the same subnet 201. In the example of FIG. 5, the scan client 203-1 also provides the neighbor list 302, which comprises a listing of IP addresses of scan clients 203 (i.e., 203-1, 203-2, ...) in the subnet 201, to the scan clients 203. A scan client 203, by way of its agent module 304, may be configured to look for and register with the designated root agent when connecting to a subnet 201. As part of the registration process, a root agent, which is the scan client 203-1 in the example of FIG. 5, may collect IP addresses from registering scan clients 203. The root agent may create a neighbor list 302 using the collected IP addresses of registered scan clients 203 and provide the neighbor list 302 to all registered scan clients 203. As will be more apparent below, a scan client 203 may advantageously use the neighbor list 302 and the intranet map 401 to determine if it is connected to the intranet 200.

Figure 6:
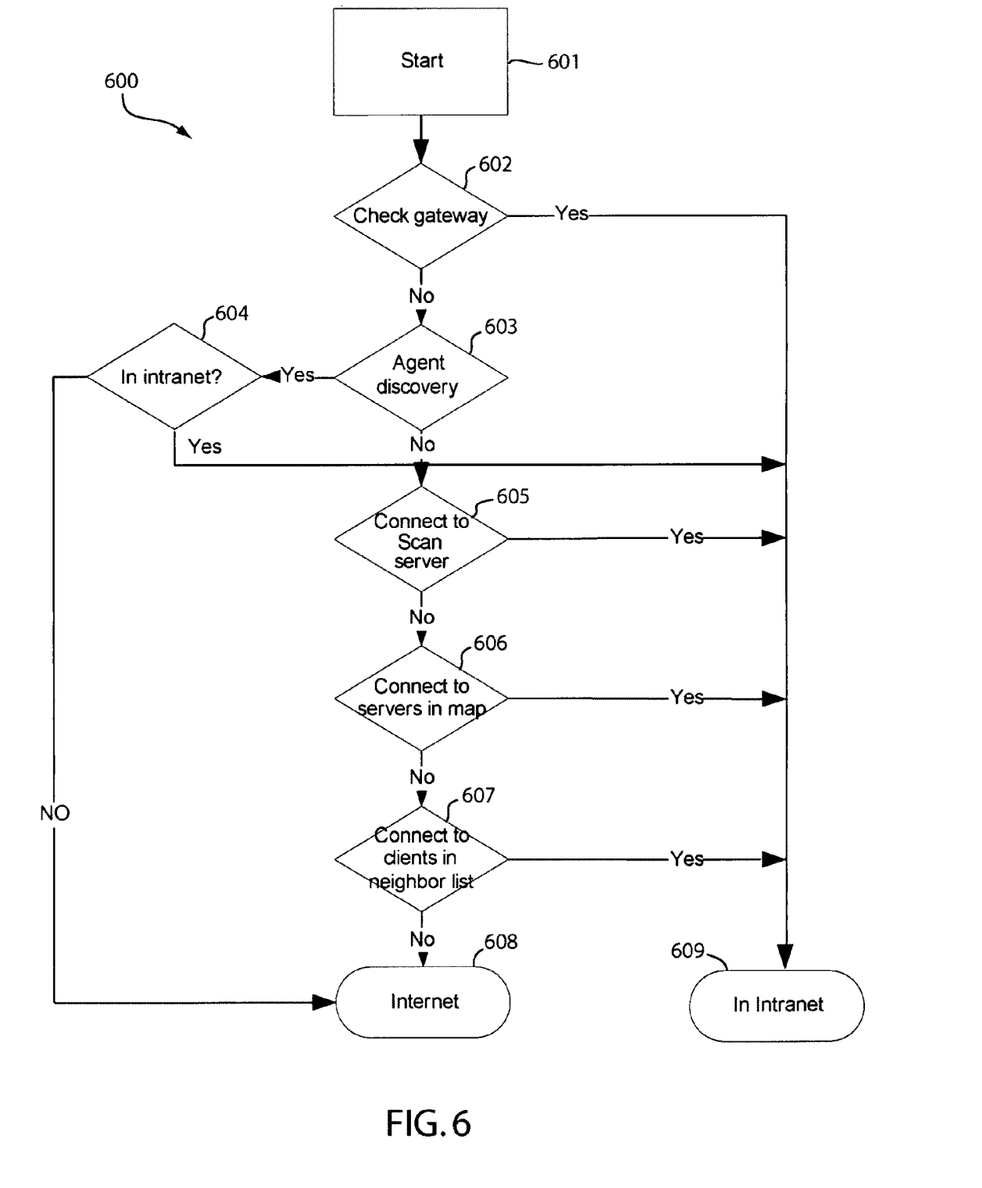
FIG. 6 schematically shows a method of automatically identifying a location of a computer in a computer network in accordance with an embodiment of the present invention.

FIG. 6 schematically shows a method 600 of automatically identifying a location of a computer in a computer network in accordance with an embodiment of the present invention. The method 600 is explained using the components shown in FIG. 3 as an example. Other components may also be used without detracting from the merits of the present invention. In the example of FIG. 6, the method 600 allows a scan client 203 to automatically determine whether it is in the intranet 200 (see block 609) or a public computer network, such as the Internet (see block 608), after moving from its previous network location.

The method 600 may be performed by an agent module 304 in a scan client 203. The scan client 203 has previously received a neighbor list 302 and an intranet map 401 from a root agent in its previous network location, for example. The method 600 may begin when the scan client 203 boots up and, by way of its agent module 304, looks for a gateway indicated in the intranet map 401 (block 601 to step 602). If the agent module 304 locates one of the gateways indicated in the intranet map 401, the scan client 203 may deem that it is connected to a subnet 201 of the intranet 200 (step 602 to block 609). At this point, by referencing the intranet map 401, the scan client 203 has information on the servers available in the subnet 201.

Information that the scan client 203 is still connected to the intranet 200 is significant as it can be used to determine what security policies to use, whether a scan server 320 is available for download of the latest antivirus modules 323, and so on.

If the scan client 203 cannot locate any of the gateways indicated in the intranet map 401, the scan client 203 proceeds to look for other scan clients 203 (step 602 to step 603). Other scan clients 203 may be found using a predetermined discovery protocol. In one embodiment, the scan client 203 sends out a broadcast indicating its presence on the subnet 201. The discovery protocol may dictate that scan clients 203, by way of their agent modules 304, in the subnet 201 respond to the broadcast. The broadcast may include some indentifying information indicating that the broadcast is from another scan client 203 running an agent module 304. Accordingly, the scan client 203 may wait for a response from other scan clients 203 for a predetermined amount of wait time.

If the scan client 203 finds another scan client 203 (step 603 to step 604), the scan client 203 waits for notification from the root agent to determine whether or not the scan client 203 is connected the intranet. The root agent may inform the scan client 203 if it is on the Internet (step 604 to step 608) or the Intranet (step 604 to step 609).

If the scan client 203 does not find another scan client 203 (step 603 to step 605), the scan client 203 designates itself as a root agent and attempts to connect to a scan server 320. The agent module 304 of the scan client 203 may be configured to connect to the scan server 320 upon initial installation, and look for that scan server 320 at this point. If the scan client 203 successfully connects to the scan server 320, the scan client 203 may deem that it is connected to the intranet 200 (step 605 to block 609).

It the scan client 203 cannot connect to the scan server 320, the scan client 203 attempts to connect to any server indicated in the intranet map 401 (step 605 to step 606). If the scan client 203 successfully connects to a server indicated in the intranet map 401, the scan client 203 may deem that is connected to the intranet 200 (step 606 to block 609). Locating a particular server indicated in the intranet map 401 also allows the scan client 203 to determine the subnet 201 it is connected to, and thus other servers available on that subnet 201.

If the scan client 203 cannot connect to a server indicated in the intranet map 401 (step 606 to step 607), the scan client 203 attempts to connect to another scan client 203 listed in its neighbor list 302 If the scan client 203 successfully connects to another scan client 203, the scan client 203 may deem that it is connected to the intranet 200. Otherwise, the scan client 203 may deem that is connected to the Internet (step 607 to block 608).

Figure 7:
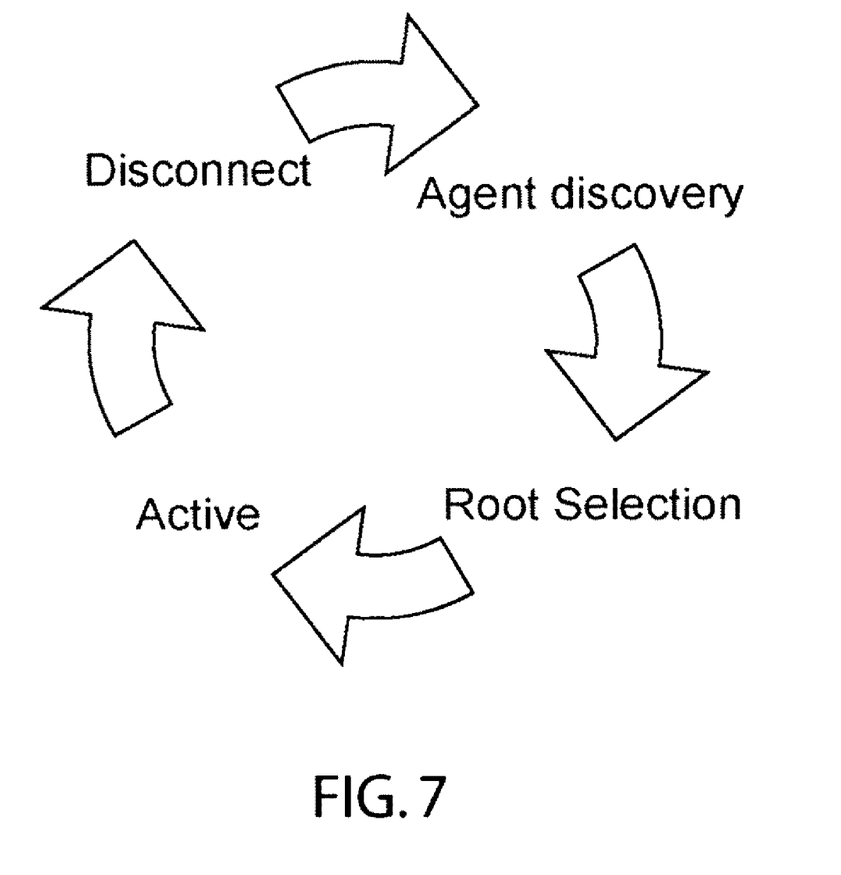
FIG. 7 shows a state diagram of an agent module in accordance with an embodiment of the present invention.

FIG. 7 shows a state diagram of an agent module 304 for agent discovery in accordance with an embodiment of the present invention. As shown in FIG. 7, the agent module 304 may cycle between disconnect, agent discovery, root selection, and active states. The agent module 304 is in the disconnect state when it is not connected to the intranet 200. The agent 304 goes from the disconnect state to the agent discovery state upon connection to a subnet 201. In the agent discovery state, the agent module 304 attempts to locate and communicate with other agent modules 304. The agent module 304 transitions from the agent discovery state to the root selection state upon locating other agent modules 304. Root selection may involve selection of a root agent in accordance with a predetermined protocol. Root selection may be based on computing resource (CPU speed, memory, etc.), length of time in the subnet 201, etc, which may be exchanged by the agent modules 304 among themselves during the agent discovery state. If the agent module 304 finds itself in a situation where it is in a subnet 201 where there are no other agent module 304, the agent module 304 may deem the scan client 203 it is running on as the root agent for that subnet.

The agent 304 transitions from the root selection state to the active state upon selection of a root agent. In the active state, the agent module 304 communicates with the root agent to, for example, register and receive antivirus modules 323. If the agent module 304 has been designated as the root agent, the agent module 304 may communicate with the scan server 320 to provide subnet information 301 and to receive an intranet map 401 and antivirus modules 320.

The agent module 304 transitions from the active to the disconnect state upon disconnecting from the intranet 200.

Figure 8:
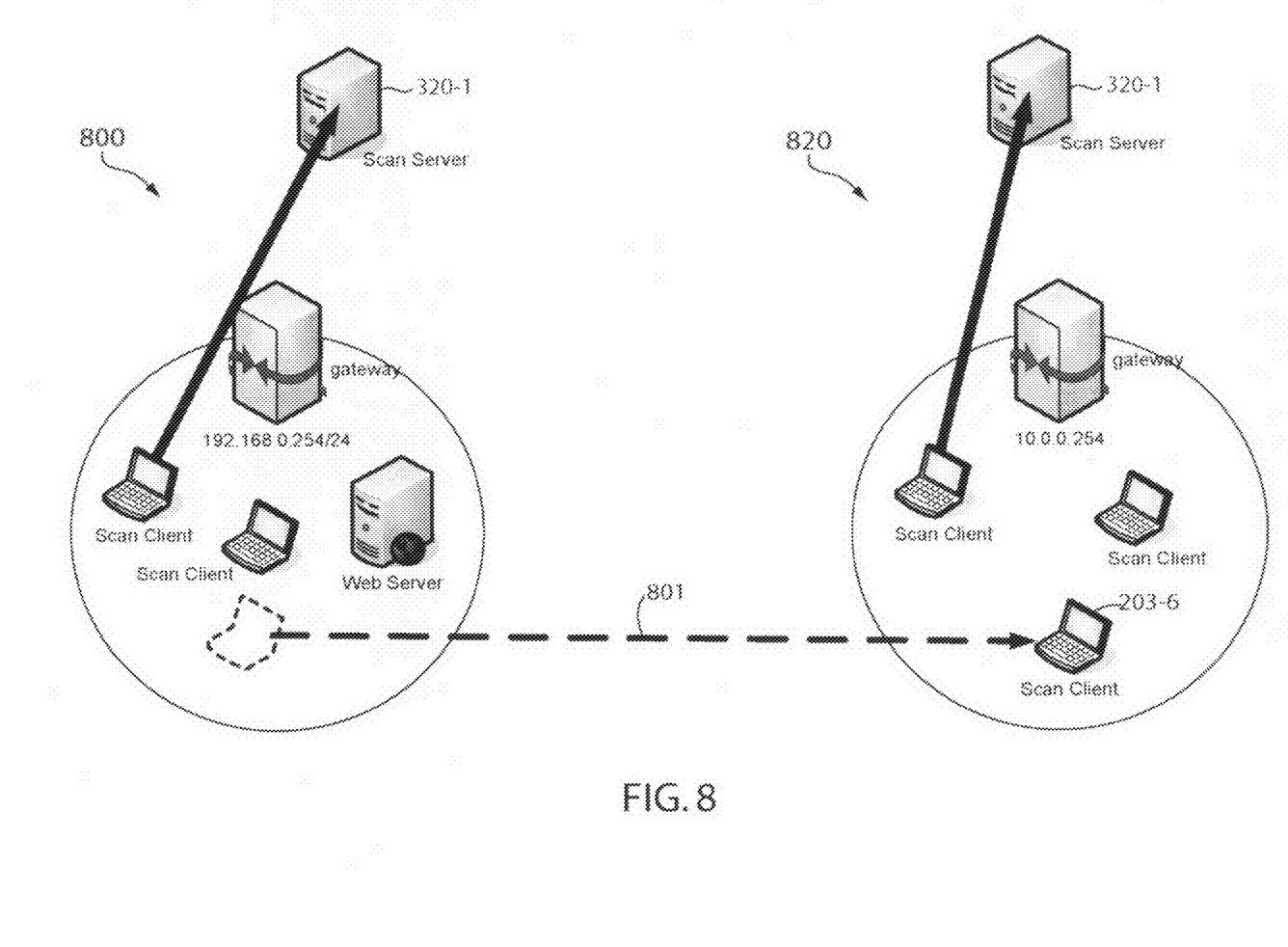
FIG. 8 schematically illustrates movement of a scan client from one intranet to another in accordance with an embodiment of the present invention.

In one embodiment, each particular scan server 320 may be assigned a unique identifier, such as a GUID (globally unique identifier). The unique identifiers of the scan servers 320 available for a particular organization may be pre-installed in all scan clients 203 upon deployment. These scan servers 320 do not necessarily have to be in the same intranet. In the example of FIG. 8, the scan client 203-8 moves from an intranet 800 to an intranet 820 (see arrow 801). Accordingly, the scan client 203 attempts to connect to either the scan server 320-1 or the scan server 320-2 using their respective unique identifiers. Once the scan client 203 finds and connects to a particular scan server 320, the scan client 203 may then attempt to register with the local root agent to obtain an intranet map and antivirus modules 323, as appropriate.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of discovering location of a computer, the method comprising:

collecting subnet information from a plurality of computers belonging to subnets of an intranet by a scan server, each of the subnet information comprising IP addresses of computers in a particular subnet of the intranet;

designating a scan client from the plurality of scan clients in each of the subnets as a root agent;

providing the subnet information to the scan server by the root agent;

creating an intranet map from the collected subnet information by the scan server;

providing the intranet map to the root agent by the scan server;
providing the intranet map to a scan client in the plurality of scan clients, by the root agent, to allow the scan client to determine whether or not the scan client is connected to a subnet of the intranet;
receiving, by the scan server, antivirus modules from a vendor of antivirus products employed in the plurality of scan clients;
receiving, by root agent, the antivirus modules from the scan server; and
providing, by the root agent, the antivirus modules to other scan clients in its particular subnet in the plurality of subnets.

2. The method of claim 1 wherein the intranet map comprises IP addresses of computers belonging to the intranet.

3. The method of claim 1 wherein using the intranet map to determine whether the computer roaming from one computer network location to another is connected to a subnet of the intranet comprises:
looking for one or more computers indicated in the intranet map.

4. A computer network comprising:
an intranet comprising a plurality of subnets;
a scan server configured to receive antivirus modules;
a gateway in each of the subnets;
a plurality of scan clients in each of the subnets, a scan client from the plurality of scan clients in each of the subnets being designated as a root agent, the root agent being configured to receive the antivirus modules from the scan server, to provide the antivirus modules to other scan clients in its particular subnet in the plurality of subnets, and to provide subnet information to the scan server, the subnet information comprising addresses of computers in the particular subnet;
wherein the scan server is further configured to create an intranet map from subnet information received from root agents and to provide the intranet map to the root agents, the root agents being configured to provide the intranet map to a particular scan client in the plurality of scan clients to allow the particular scan client to determine whether or not the particular scan client is connected to the intranet; and
wherein the scan server is further configured to receive the antivirus modules from a vendor of antivirus products employed in the plurality of scan clients.

5. The computer network of claim 4 wherein the intranet map comprises IP addresses of computers in the subnets.

6. The computer network of claim 4 wherein subnet information includes IP and MAC addresses of gateways employed in the particular subnet.

7. A computer-implemented method of discovering location of a computer, the method comprising:
a scan server receiving addresses of computers belonging to different subsections of a computer network from a first computer;
the scan server building a listing of the addresses;
providing the listing of the addresses to a first computer by the scan server;
providing the listing of the addresses from the first computer to a second computer;
using the listing of the addresses in the second computer to determine whether the second computer is connected to the computer network by connecting the second computer to one or more computers indicated in the listing of the addresses;
the scan server configured to receive antivirus modules from a vendor of antivirus products and to provide the antivirus modules to the first computer; and
the first computer configured to provide the antivirus modules to the second computer.

8. The method of claim 7 wherein the different subsections comprise subnets of an intranet, the computer network comprises:
an intranet, and the listing of the addresses comprises an intranet map comprising IP addresses of computers belonging to the subnets.

9. The method of claim 8 wherein the intranet map includes IP and MAC addresses of a gateway in each of the subnets.

10. The method of claim 7 wherein the first computer and the second computer belong to the same subnet.

* * * * *